Oct. 21, 1952     E. H. BICKLEY     2,614,950
APPARATUS FOR USE IN MAKING LANTERN SLIDES
Filed April 11, 1950
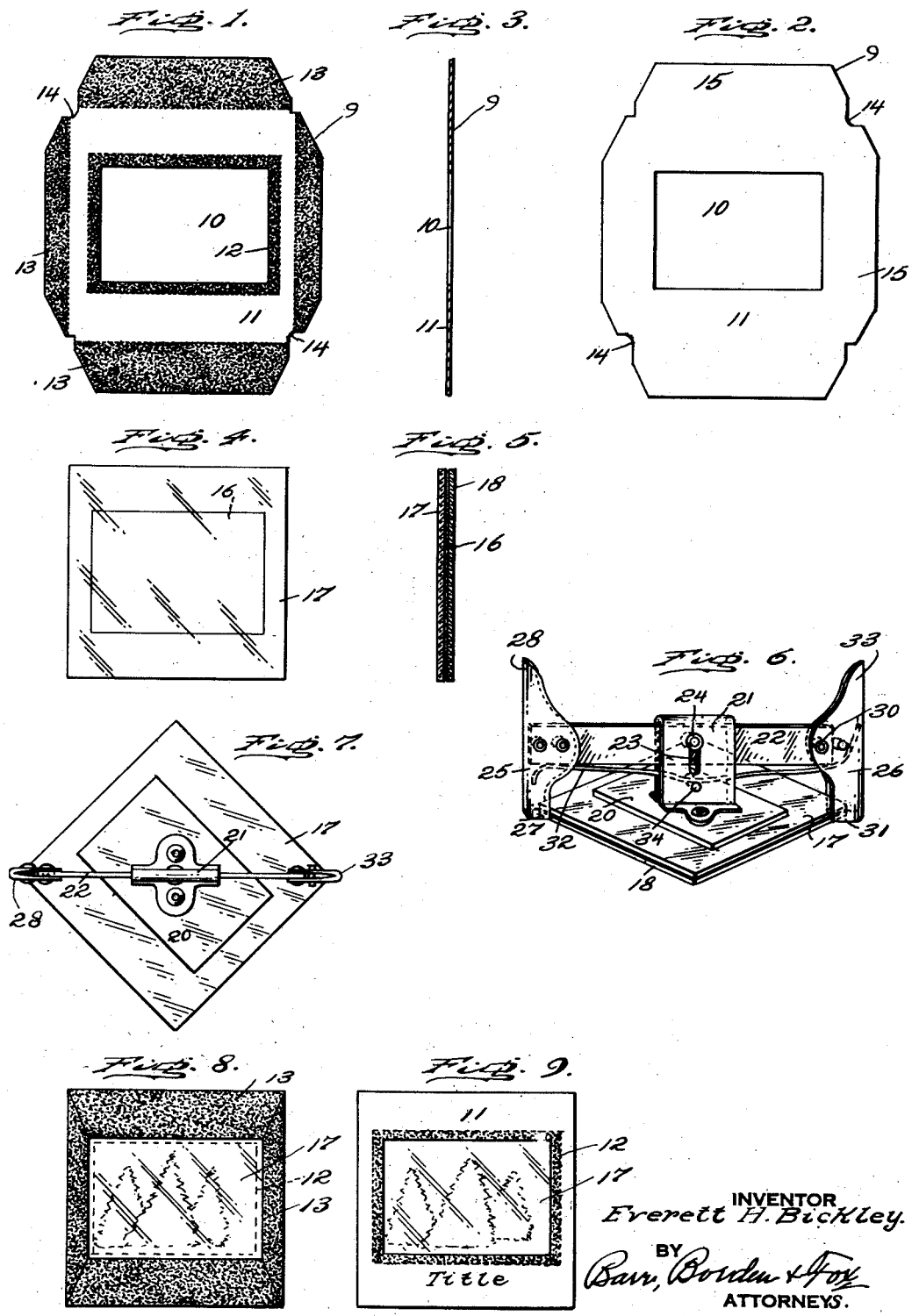
INVENTOR
*Everett H. Bickley.*
BY
*Barr, Borden & Fox*
ATTORNEYS.

Patented Oct. 21, 1952

2,614,950

UNITED STATES PATENT OFFICE 2,614,950

APPARATUS FOR USE IN MAKING LANTERN SLIDES

Everett H. Bickley, Narberth, Pa.

Application April 11, 1950, Serial No. 155,196

7 Claims. (Cl. 154—1.6)

The present invention relates to transparencies for projection purposes and more particularly to Kodachrome transparencies.

Transparencies of the type to which the present invention relates have heretofore been supplied in small card board mounts with no protection for either side of the film. Inasmuch as considerable expenditure of time and money is involved in taking a picture, developing and mounting a film, it is obvious that the preservation of the film is of considerable importance. Numerous attempts have been made to protect such films from injury, fading and buckling during projection, but without accomplishing the desired result. In some instances, it has been proposed to use glass mounts for the film, but these have been found unsatisfactory because a mask is used and consequently a small air space is formed between the film and the glass on both sides so that generated heat in projecting the picture concentrates upon the film instead of being conducted away, as it should. It has also been found that in such mounted films the films fade quicker. Furthermore, in the prior mounting of films there is no way in which it can be adjusted to compensate for inaccuracy in levelling the camera, or aiming the camera in taking the picture. A further disadvantage of prior mounting of picture films is due to the use of gummed tape for assembly purposes, which exudes a sticky compound which picks up dirt, gets on the face of the slide, and causes buckling of the film which admits air to result in fading and movement of the film during projection. Also, in the mounting the tape is doubled or overlapped at the corners so that slides are held apart to take up more room in the storage box, and cause the slides to catch when using an automatic feeding device for projection.

Some of the objects of the present invention are: to provide a novel method of assembling a film slide for projection purposes; to provide an improved transparency slide; to provide a film mounting wherein an internal mask is eliminated; to provide a film mounting having a novel binder arranged and assembled so that there is no doubling of the binder at the corners; to provide a film mounting including protecting glass plates in which the film can be adjusted prior to binding; to provide a film mounting wherein the film is rigidly held under pressure at all times; to provide a film mounting utilizing glass protecting plates so assembled as to exclude air from the film and cause generated heat to be conducted away directly by the glass; and to provide other improvements and objects as will become apparent as to the description proceeds.

In the accompanying drawings, Fig. 1 represents a plan of a binder for a film photograph showing one face thereof; Fig. 2 represents a like plan showing the opposite face thereof; Fig. 3 represents a section taken lengthwise transversely of either Fig. 1 or 2; Fig. 4 represents a plan of the film-mounting glass showing a step in the method of mounting; Fig. 5 represents a section transverse of the assembly of Fig. 4; Fig. 6 represents a perspective of the pressure clamping assembly step in the method of mounting; Fig. 7 represents a plan of the parts shown in Fig. 6; Fig. 8 represents a plan of the slide formed by the method of the invention and showing one side thereof; and Fig. 9 represents a like plan showing the opposite side of the slide.

Referring to Figs. 1, 2 and 3 of the drawings, the paper binder 9 used in the invention is shown having a window 10, through which the picture is viewed, and an encircling area 11 dimensioned for exact registration with a picture film protecting glass. Considered lengthwise of the window 10, the upper and lower portions of the area 11 are relatively wide while the other two areas along the respective ends of the window 10 are relatively narrow. By so dimensioning the binder the wider areas provide plenty of room for writing in the title of the picture on the completed slide. The window 10 is also preferably framed by an opaque border 12 which serves in the completed slide not only to accent the picture but also to conceal the perforations common to motion picture film.

The sides of the area 11 are respectively provided with extensions in the form of flaps 13 arranged to be folded around and back of a glass mount in the assembling operation. Each such flap 13 has a length substantially equal to the corresponding width of the area 11 framing the opaque border 12. Also one face of each of the flaps 13 is printed in black to ensure complete opacity around the border 12. It should be noted that at two diagonally opposite corners of the binder the two meeting ends of each diagonally opposite pair of flaps are designedly spaced by an accurate cut-out 14 to provide a relatively small opening in order to expose a corner of the glass mount as will later appear. The opposite face 15 of the binder is coated with a suitable adhesive which when moistened will serve to attach the binder to the glass mount.

The method of making a lantern slide in accordance with the invention consists in substantially centering the picture film 16 between two relatively thin glass plates 17 and 18 of the size and shape usual for a finished slide, holding these plates properly superposed while applying pressure to the area where the film is located. One form of holding and pressing means consists of a gauge plate 20 preferably of transparent plastic and corresponding in shape and size to the dimensions of a picture film, carried by an upstanding pressure member 21 which is shaped to straddle a rigid strip 22 and be transversely slidable thereon through the medium of a slot 23 and pin 24, this latter being fixed to the strip 22.

In order to hold the glass plates 17 and 18 firmly gripping the film therebetween, the opposite ends of the strip 22 are respectively connected to two clamping jaws 25 and 26, the former being a fixed jaw, while the latter is pivoted to swing in the plane of the strip 22, and the other jaw 25. The jaw 25 projects below the bottom edge of the strip to terminate in a closed end gripping slot 27 of sufficient width to seat a corner of the two film-retaining plates. The opposite end of the jaw 25 projects above the top edge of the strip 22 to form a thumb abutment 28. The jaw 26 is pivoted on the pivot 30 and projects below the bottom edge of the strip 22 to terminate in a closed end gripping slot 31 of sufficient width to seat a corner of the two film-retaining plates 17 and 18. In gripping position the two jaws 25 and 26 are spaced apart less than the length of the diagonal between the two plate corners to be held, but by reason of the pivoting of the jaw 26 the spacing can be increased to permit the diagonal insertion of the plates. The jaw 26 is biased to gripping position by a spring 32 having an offset end bearing against the jaw 26 above the pivot 30, while the other end of this spring 32 is offset and fixed in the jaw 25. The jaw 26, like the jaw 25, has an upwardly disposed extension forming a finger abutment 33 so that when the user's thumb is against the abutment 28 and a finger against the abutment 33, a squeezing action will separate the jaws to receive the face to face plates. When so placed, the release of finger pressure causes the jaws to grip the plates.

As a means for exerting pressure on the gauge plate 20, the intermediate length of the spring 32 is bowed to bear against a pin 34 fixed to the member 21 between the spring and the gauge plate. Sliding movement of the member 21 is made possible by the provision of the vertical slot 23 and the pin 24 fixed to the strip 22. Normally, the gauge plate 20 under its spring bias lies substantially in the same plane as the ends of the jaws 25 and 26 and consequently in order to bring the glass plate assembly into position for engagement by the jaws, the gauge plate must be pressed back against its spring as the assembly is brought between the jaws. By releasing the spring biased jaw, the jaws now grip the assembly at two diagonal corners and the closed ends bear against the bottom face of the assembly to react against the spring pressed gauge plate which is in contact with the top face of the assembly to clamp the film in place. In case the film does not register exactly with the gauge, a thin blade can be inserted between the clamped plates 17 and 18 to maneuver the film either into proper register with the gauge or to bring a distorted picture to a true horizontal. With the picture film's position corrected, the clamped assembly is ready for the application of the binder 9. This is done by moistening the adhesive side of the binder into a tacky condition, registering the clamped assembly with the binder and pressing the exposed glass plate 18 against the tacky face of the binder. This registration can be made very accurately, because of the arcuate cutouts 14 which exactly receive the respective jaw-gripping ends, and the other V corner notches. The flaps 13 are now folded over and pressed into permanent contact with the face of the plate 17 to form a mask through which the film and its opaque border 12 are visible. The border 12 serves to conceal the perforations common to motion picture films. Preferably the moistening of the binder is done by placing it adhesive side down on a rough piece of wet cloth where it is held by a glass plate during the positioning of the film between the glasses of the mount, following which the binder can be folded into place while moist. In this operation it will be seen that only two corners of the assembly have to be watched because the other two are automatically located by the gripping jaws 27 and 31. Since the binder dries very quickly, the setting takes place in a few seconds so that the clamping holder can be removed and the shrinkage of the paper binder in setting draws the glass together with great pressure. It should also be noted that the assembled mount provides a relatively large exposed white surface for writing the title of the picture. This can be done by holding the slide to the light and marking the title on the white side underneath the picture, and gives an indication for inserting the slide into the projector properly (upside down).

It will now be apparent that a novel method of making a transparency slide has been devised which produces a new and different slide from those heretofore in use and having advantages not heretofore obtainable. Among the advantages outlined above particular attention should be given to the dissipation of heat from the projector by the direct conduction of the glass in the present assembly. Because of the air space in ordinary masked slides, this heat goes through the clear portions of the film but is stopped by the darker portions since the latter absorb a great deal more heat than the clear portion. This causes the film as ordinarly mounted to buckle and become very wavy, and as this buckling is toward the lamp, the focus on the screen is changed. If the lens is set for the hot position it will be wrong for the cold position and vice versa. With the mount of the present invention the film is held rigidly between the glass plates so that any local heating of dark portion of the film is prevented because the heat is quickly absorbed from the film into the contacting glass. Furthermore, the film being clamped rigidly between the glass plates cannot buckle or move at all and in consequence there is no change of focus from the start to finish of showing a series of slides.

Having thus described my invention, I claim:

1. An apparatus for use in forming a lantern slide of the type made of two square glass plates with a picture film therebetween and held together by a square masking paper binder having two diagonally disposed notches, comprising a strip conforming substantially in length to the diagonal length of said plates, releasable clamping jaws respectively carried by opposite ends of said strip for respectively seating two diagonally disposed corners of said plates, and spring pressed means coacting with said strip for holding said plates in seated position, whereby said binder can be folded about the sides of said plates with said notches respectively straddling said jaws.

2. An apparatus for use in forming a lantern slide of the type made of two face-to-face square glass plates, with a picture film therebetween, and held together by a square masking paper binder having two diagonally disposed notches, comprising a strip to be positioned diagonally across and spaced from said glass plates, a fixed jaw carried by one end of said strip to seat a corner of said plates, a pivoted jaw carried by the other end of said strip to seat the opposite corner of said plates, spring means for holding said pivoted jaw in clamping position against said plates, and spring pressed means carried by said strip for holding said plates together while seated in said jaws, whereby said binder can be folded about the sides of said plates with said notches respectively straddling said jaws.

3. An apparatus for use in forming a lantern slide in accordance with claim 2 wherein said spring pressed holding means includes a gauge plate to seat on the upper of said glass plates.

4. An apparatus for use in forming a lantern slide of the type made of two square glass plates with a picture film therebetween and held together by a square masking paper binder, comprising a clamping element including two juxtaposed jaws normally spaced less than the length of a selected dimension of a plate, one of said jaws being movable away from the other for positioning said plates between said jaws, and a spring on said movable jaw for restoring said jaw when said plates are so positioned, whereby said binder can be folded about the plate margins.

5. An assembly holder for use in forming a lantern slide of the type made of two square glass plates with a picture film therebetween and held together by a masking paper binder, comprising a strip, oppositely disposed jaws carried by said strip, each jaw having a seat to support said plates with film therebetween in accurate alinement, spring biased means carried by said strip to coact with said seats for squeezing said plates and film together, gauge plate means carried by said squeezing means to indicate the window location on the finished slide, and jaw releasing means for said seats, whereby the slide can be removed after applying said binder.

6. An assembly holder for lantern slides in accordance with claim 5, wherein said jaws are offset at substantially right angles to said strip to provide a clearance for applying a binder.

7. An assembly holder for lantern slides in accordance with claim 5 wherein said releasing means includes opposed extensions on said jaws for manual operation.

EVERETT H. BICKLEY.

REFERENCES CITED

The following references are of record in the file of this patent:

UNITED STATES PATENTS

| Number | Name | Date |
| --- | --- | --- |
| 1,167,795 | Cilley | Jan. 11, 1916 |
| 1,524,797 | Mayer | Feb. 3, 1925 |
| 1,932,464 | Hyde | Oct. 31, 1933 |
| 2,294,159 | Calabro | Aug. 25, 1942 |
| 2,338,189 | Libby et al. | Jan. 4, 1944 |
| 2,496,406 | Patrick | Feb. 7, 1950 |